US009111697B2

United States Patent
Otani et al.

(10) Patent No.: US 9,111,697 B2
(45) Date of Patent: Aug. 18, 2015

(54) POWER SWITCHGEAR

(75) Inventors: Hirokazu Otani, Tokyo (JP); Toru Yamashita, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/370,073

(22) PCT Filed: Apr. 10, 2012

(86) PCT No.: PCT/JP2012/059807
§ 371 (c)(1),
(2), (4) Date: Jul. 1, 2014

(87) PCT Pub. No.: WO2013/153623
PCT Pub. Date: Oct. 17, 2013

(65) Prior Publication Data
US 2014/0360850 A1  Dec. 11, 2014

(51) Int. Cl.
*H01H 9/24* (2006.01)
*H01H 31/32* (2006.01)
*H01H 33/14* (2006.01)
*H02B 13/00* (2006.01)

(52) U.S. Cl.
CPC .................. *H01H 9/24* (2013.01); *H01H 31/32* (2013.01); *H02B 13/005* (2013.01); *H01H 33/14* (2013.01); *H01H 2221/052* (2013.01)

(58) Field of Classification Search
CPC ......... H01H 9/24; H01H 31/26; H01H 31/28; H01H 31/32; H01H 2031/286; H01H 33/14; H01H 33/90; H01H 33/91; H02B 13/005
USPC ........... 200/50.28; 218/14, 16, 17, 18, 19, 20, 218/115, 116, 151, 152, 153, 154
See application file for complete search history.

(56) References Cited

U.S. PATENT DOCUMENTS

| | | | | |
|---|---|---|---|---|
| 5,045,652 | A * | 9/1991 | Yanabu et al. | 218/45 |
| 6,018,134 | A * | 1/2000 | Hirano et al. | 218/70 |
| 6,466,420 | B1 * | 10/2002 | Chuniaud et al. | 361/2 |
| 2014/0198429 | A1 * | 7/2014 | Kawakami et al. | 361/605 |

FOREIGN PATENT DOCUMENTS

| | | |
|---|---|---|
| JP | 59-207517 A | 11/1984 |
| JP | 61-1 891 05 A | 8/1986 |

(Continued)

OTHER PUBLICATIONS

International Search Report (PCT/ISA/210) mailed on Jul. 17, 2012, by the Japanese Patent Office as the International Searching Authority for International Application No. PCT/JP2012/059807.

(Continued)

*Primary Examiner* — Renee S Luebke
*Assistant Examiner* — William Bolton
(74) *Attorney, Agent, or Firm* — Buchanan Ingersoll & Rooney PC

(57) ABSTRACT

Each outermost part of fixed-side connection conductors, fixed-side fixed contacts, movable-side fixed contacts, and movable-side connection conductors are placed outside of an outermost diameter of a fixed-side conductor and a movable-side conductor, as viewed from an axis line of the fixed-side conductor and the movable-side conductor as a center. This arrangement provides a power switchgear that can diminish mutual effects of currents among conduction parts to suppress decrease in a current-carrying capacity for each of the conduction parts and to increase a current-carrying capacity for a total of the conduction parts, without increasing the size of the switchgear.

4 Claims, 2 Drawing Sheets

(56) References Cited

FOREIGN PATENT DOCUMENTS

| JP | 6-243940 A | 9/1994 |
| JP | 2008-053074 A | 3/2008 |
| JP | 2009-059541 A | 3/2009 |

OTHER PUBLICATIONS

Written Opinion (PCT/ISA/237) mailed on Jul. 17, 2012, by the Japanese Patent Office as the International Searching Authority for International Application No. PCT/JP2012/059807.

* cited by examiner

A-A ARROW VIEW

POWER SWITCHGEAR

FIELD

The present invention relates to a power switchgear, and more particularly to a power switchgear such as a main circuit switchgear used in a power system for power generation, power transformation, or the like.

BACKGROUND

Patent Literature 1 proposes a power switchgear including a plurality of movable contacts. In this conventional technique, a plurality of disconnecting-part movable-side cylindrical finger contacts are connected to a disconnecting-part movable-side conductor and disconnecting-part cylindrical movable conductors (movable contacts) are inserted through the disconnecting-part movable-side cylindrical finger contacts, respectively, to be capable of reciprocating. The disconnecting-part movable-side cylindrical finger contacts are arranged radially inside of the outer diameter of the disconnecting-part movable-side conductor (see FIG. 2 in Patent Literature 1).

CITATION LIST

Patent Literature

Patent Literature 1: Japanese Patent Application Laid-open No. 2008-53074

SUMMARY

Technical Problem

In the power switchgear described in Patent Literature 1 mentioned above, a plurality of conduction parts are provided to correspond to the disconnecting-part cylindrical movable conductors (the movable contacts), respectively. However, because the disconnecting-part movable-side cylindrical finger contacts are arranged radially inside of the outer diameter of the disconnecting-part movable-side conductor, the conduction parts are close to each other.

Accordingly, due to mutual effects of currents flowing through the conduction parts, the currents are difficult to flow on the side where the conduction parts are close to each other and the currents easily flow on the side where the conduction parts are distant from each other, so that uneven flows occur in the conduction parts. Due to the uneven flows, the amounts of heat generation in the conduction parts also become uneven and thus portions having a larger amount of heat generation and a higher temperature are locally produced. As a result, a problem occurs that the total current-carrying capacity of the conduction parts adversely becomes lower than the sum of current-carrying capacities obtained when the conduction parts are separately applied with currents.

The present invention has been achieved in view of the above problem, and an object of the present invention is to provide a power switchgear that can diminish the mutual effects of currents among conduction parts to suppress decrease in a current-carrying capacity for each of the conduction parts and to increase a current-carrying capacity for a total of the conduction parts, without increasing the size of the switchgear.

Solution to Problem

The present invention is directed to a power switchgear that achieves the object. The power switchgear includes a cylindrical fixed-side conductor; a cylindrical movable-side conductor that has an axis line aligned with an axis line of the fixed-side conductor and that is arranged to face the fixed-side conductor at a predetermined distance; a plurality of cylindrical fixed-side connection conductors that are attached to the fixed-side conductor on a side of the movable-side conductor, and that have each axis line parallel to the axis line of the fixed-side conductor; a plurality of cylindrical movable-side connection conductors that are attached to the movable-side conductor on a side of the fixed-side conductor, have each axis line parallel to the axis line of the movable-side conductor, and that are arranged at positions facing the fixed-side connection conductors; cylindrical fixed-side fixed contacts that are connected to each of the fixed-side connection conductors, and that are arranged to have axis lines parallel to the axis line of the fixed-side conductor; cylindrical movable-side fixed contacts that are connected to each of the movable-side connection conductors, and that are arranged to have axis lines parallel to the axis line of the movable-side conductor; and movable contacts that are attached to the movable-side conductor to be capable of reciprocating in a direction of the axis line of the movable-side conductor, and that are inserted through each of the movable-side connection conductors, wherein each outermost part of the fixed-side connection conductors, the fixed-side fixed contacts, the movable-side fixed contacts, and the movable-side connection conductors are located outside of each outermost diameter of the fixed-side conductor and the movable-side conductor, as viewed from the axis line of the fixed-side conductor and the movable-side conductor as a center.

Advantageous Effects of Invention

According to the present invention, conduction parts can be arranged at a larger mutual distance without increasing the size of the apparatus. Therefore, mutual effects of currents among the conduction parts can be diminished to suppress decrease in a current-carrying capacity for each of the conduction parts and to increase a current-carrying capacity for a total of the conduction parts.

DESCRIPTION OF EMBODIMENTS

Exemplary embodiments of a power switchgear according to the present invention will be explained below in detail with reference to the accompanying drawings. The present invention is not limited to the embodiments.

Embodiment

Figure 1:
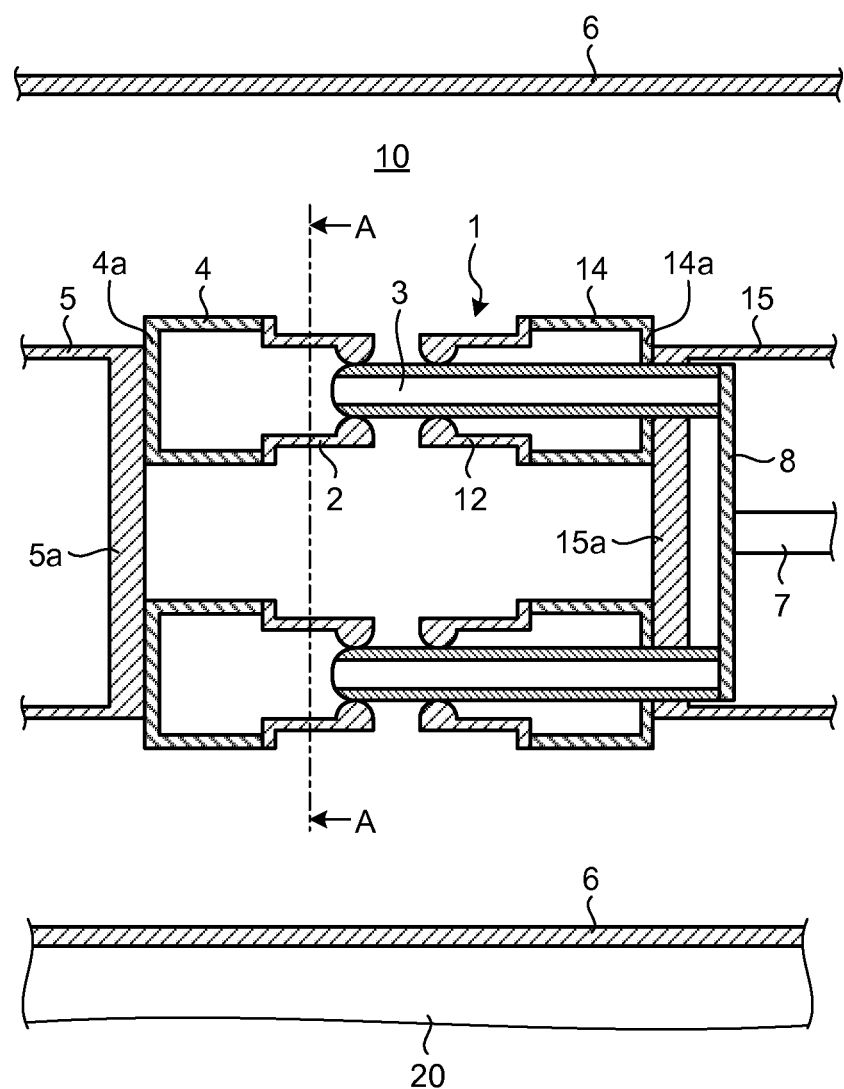
FIG. 1 is a longitudinal sectional view of a configuration of a power switchgear according to an embodiment.
Figure 2:
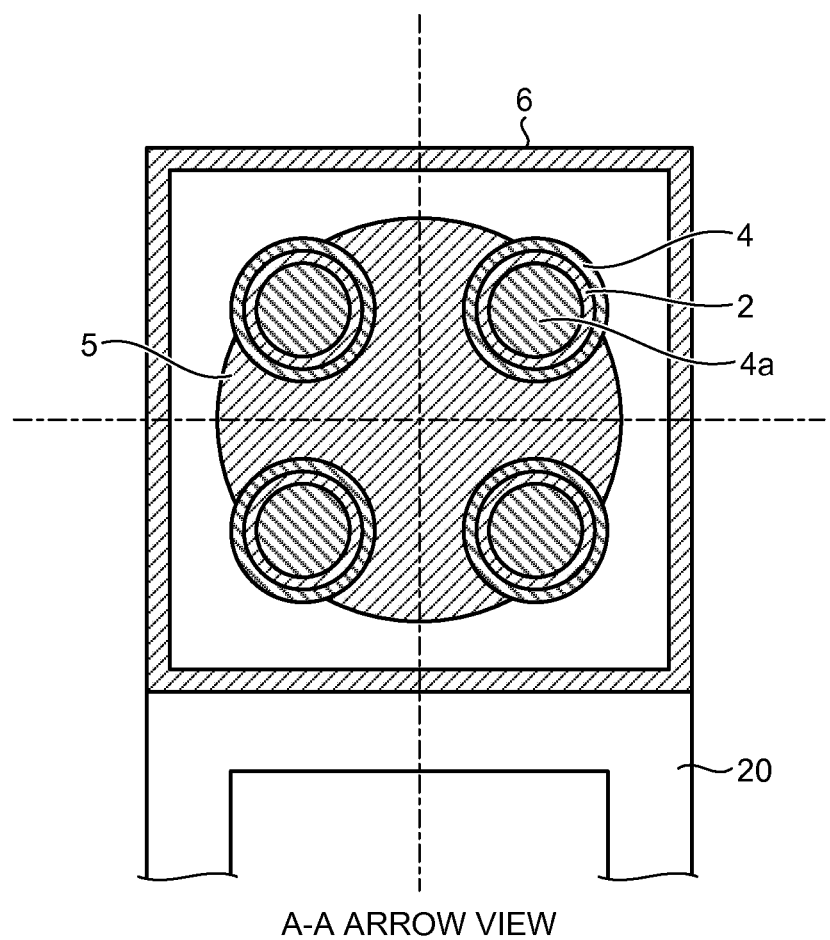
FIG. 2 is a sectional view on arrows A-A in FIG. 1.

FIG. 1 is a longitudinal sectional view of a configuration of a power switchgear according to an embodiment of the present invention. FIG. 2 is a sectional view on arrows A-A in FIG. 1. A configuration of a disconnecting part 10 serving as a power switchgear is explained below with reference to FIGS. 1 and 2. The present embodiment is also applicable to switchgears other than the disconnecting part.

The disconnecting part 10 includes fixed-side fixed contacts 2, fixed-side connection conductors 4, a fixed-side conductor 5, movable-side fixed contacts 12, movable-side connection conductors 14, a movable-side conductor 15, movable contacts 3, an operating rod 7, and a flange 8. The disconnecting part 10 is arranged within an exterior covering 6 and the exterior covering 6 is placed on a mount 20. The exterior covering 6 is grounded. The exterior covering 6 is, for example, quadrangular in a cross section.

The fixed-side conductor 5 and the movable-side conductor 15 are arranged to face each other at a predetermined distance in an opening/closing direction, which is a movement direction of the movable contacts 3. The fixed-side conductor 5 and the movable-side conductor 15 are cylindrical and are arranged in such a manner that axis lines thereof are aligned with each other in parallel to the opening/closing direction. The fixed-side conductor 5 and the movable-side conductor 15 have, for example, the same diameter. In the example shown in the drawings, the opening/closing direction is horizontal, for example.

The fixed-side conductor 5 has a shape of a cylinder bottomed on the side of the movable-side conductor 15 and a plurality of fixed-side connection conductors 4 are attached to a bottom 5a of the fixed-side conductor 5. The fixed-side connection conductors 4 are cylindrical and have axis lines parallel to the opening/closing direction, respectively. For example, the fixed-side connection conductors 4 all have the same diameter. The fixed-side fixed contacts 2 are connected to the fixed-side connection conductors 4, respectively. The fixed-side connection conductors 4 have, for example, a shape of a cylinder bottomed on the fixed-side conductor 5 and opened on the side of the fixed-side fixed contacts 2. A part of a bottom 4a of each of the fixed-side connection conductors 4 is connected to the bottom 5a of the fixed-side conductor 5. The fixed-side fixed contacts 2 are, for example, cylindrical finger contacts and are respectively constituted by a plurality of contact pieces. For example, the fixed-side fixed contacts 2 all have the same diameter. Axis lines of the fixed-side fixed contacts 2 are parallel to the axis lines of the fixed-side connection conductors 4 and are aligned therewith in the example shown in the drawings, respectively. The fixed-side connection conductors 4 have, for example, a diameter larger than that of the fixed-side fixed contacts 2. For example, four fixed-side connection conductors 4 are provided. The fixed-side connection conductors 4 are arranged at an equal angular interval on the same circumference around the axis line of the fixed-side conductor 5, for example. The four fixed-side connection conductors 4 are arranged at angular positions of 45 degrees with respect to a horizontal plane including the axis line of the fixed-side conductor 5, respectively. The number of the connected fixed-side connection conductors 4 is not limited to four.

In the present embodiment, the outermost parts of the fixed-side connection conductors 4 are located outside of the outermost diameter of the fixed-side conductor 5 as viewed from the axis line of the fixed-side conductor 5 as the center. The outermost parts of the fixed-side fixed contacts 2 are located outside of the outermost diameter of the fixed-side conductor 5 as viewed from the axis line of the fixed-side conductor 5 as the center.

The movable-side conductor 15 has a shape of a cylinder bottomed on the side of the fixed-side conductor 5 and the movable-side connection conductors 14 as many as the fixed-side connection conductors 4 are attached to a bottom 15a of the movable-side conductor 15. The movable-side connection conductors 14 are cylindrical and have axis lines parallel to the opening/closing direction, respectively. The movable-side connection conductors 14 all have the same diameter, for example. The movable-side fixed contacts 12 are connected to the movable-side connection conductors 14, respectively. The movable-side connection conductors 14 have, for example, a shape of a cylinder bottomed on the side of the movable-side conductor 15 and opened on the side of the movable-side fixed contacts 12. A part of a bottom 14a of each of the movable-side connection conductors 14 is connected to the bottom 15a of the movable-side conductor 15. The movable-side fixed contacts 12 are, for example, cylindrical finger contacts and are respectively constituted by a plurality of contact pieces. The movable-side fixed contacts 12 all have the same diameter, for example. Axis lines of the movable-side fixed contacts 12 are parallel to axis lines of the movable-side connection conductors 14 and are aligned therewith in the example shown in the drawings, respectively. For example, the movable-side connection conductors 14 have a diameter larger than that of the movable-side fixed contacts 12. The movable-side connection conductors 14 are arranged at an equal angular interval of 45 degrees on the same circumference around the axis line of the movable-side conductor 15 to correspond to arrangement positions of the fixed-side connection conductors 4, respectively. That is, the fixed-side connection conductors 4 are arranged to face the movable-side connection conductors 14 in the axis line direction, respectively.

The movable contacts 3 as many as the movable-side fixed contacts 12 are provided. The movable contacts 3 are inserted through insertion holes provided in the bottom 15a of the movable-side conductor 15 and insertion holes provided in the bottoms 14a of the corresponding movable-side connection conductors 14 and have ends attached to the flange 8, respectively. The flange 8 is connected to the operating rod 7. The operating rod 7 is coupled to an operating device (not shown) and is driven right and left in FIG. 1. The movable contacts 3 are driven by the operating rod 7 to be contacted with or separated from the fixed-side fixed contacts 2 and the movable-side fixed contacts 12, respectively, thereby achieving closing or opening.

In the present embodiment, the outermost parts of the movable-side connection conductors 14 are located outside of the outermost diameter of the movable-side conductor 15 as viewed from the axis line of the movable-side conductor 15 as the center. The outermost parts of the movable-side fixed contacts 12 are located outside of the outermost diameter of the movable-side conductor 15 as viewed from the axis line of the movable-side conductor 15 as the center.

As described above, in the present embodiment, a plurality (four in the example shown in the drawings) of conduction parts 1 each including the fixed-side connection conductor 4, the fixed-side fixed contact 2, the movable contact 3, the movable-side fixed contact 12, and the movable-side connection conductor 14 are provided and these conduction parts 1 are arranged, for example, at an equal angular interval around the common axis line of the fixed-side conductor 5 and the movable-side conductor 15. The outermost parts of the fixed-side connection conductors 4, the fixed-side fixed contacts 2, the movable-side fixed contacts 12, and the movable-side connection conductors 14 are located outside of the outermost diameters of the fixed-side conductor 5 and the movable-side conductor 15 as viewed from the common axis line of the fixed-side conductor 5 and the movable-side conductor 15 as the center.

An operation according to the present embodiment is explained. A state where the movable contacts 3 are in contact with both of the fixed-side fixed contacts 2 and the movable-side fixed contacts 12 is a closed state and a state where the movable contacts 3 are separated from the fixed-side fixed contacts 2 is an opened state. During current application (during closing), a current flows from the fixed-side conductor 5 through the fixed-side connection conductors 4, the fixed-side fixed contacts 2, the movable contacts 3, the movable-side fixed contacts 12, and the movable-side connection conductors 14 to the movable-side conductor 15. Because a plurality of the conduction parts 1 is provided, the current is divided to flow through the conduction parts 1.

As described above, in the present embodiment, the outermost parts of the fixed-side connection conductors 4, the fixed-side fixed contacts 2, the movable-side fixed contacts 12, and the movable-side connection conductors 14 are located outside of the outermost diameters of the fixed-side conductor 5 and the movable-side conductor 15, as viewed from the common axis line of the fixed-side conductor 5 and the movable-side conductor 15 as the center. Therefore, the conduction parts 1 can be arranged more outside of the axis line, and thus the distances between the conduction parts 1 can be increased.

This can diminish the mutual effects of currents among the conduction parts 1 and increase the current-carrying capacities. Therefore, it is unnecessary to increase the size of conductor components applied with currents to increase the current-carrying capacities, and increase in the cost can be suppressed.

Furthermore, because the conduction parts 1 are arranged more outside of the axis line, surface areas of conductor portions exposed to air are increased and cooling is promoted, so that the current-carrying capacities can be further increased. In this example, the disconnecting part 10 is arranged in air, not in insulating gas.

Generally, when there are other conduction parts around a conduction part, uneven flows of currents that are hard to be applied to portions close to each other occur due to a mutual effect of applied currents and the current-carrying capacities of the conduction parts are decreased. When the distances between the conduction parts are reduced, the uneven flows of currents increase and the current-carrying capacities are further decreased.

In the conventional power switchgear, a plurality of movable-side fixed contacts are arranged radially inside of the outer diameter of a movable-side conductor and a plurality of fixed-side fixed contacts are arranged radially inside of the outer diameter of a fixed-side conductor (see FIG. 2 in Patent Literature 1). Accordingly, in the conventional power switchgear, the total current-carrying capacity is lower than in a case where the conduction parts are separately applied with currents due to uneven flows of the applied currents.

On the other hand, in the present embodiment, the mutual effects of the applied currents are diminished to suppress local overheat and the surface areas are increased to promote cooling. Accordingly, a power switchgear that has a larger current-carrying capacity with respect to a temperature increase can be obtained without increasing the size of the components.

The conduction parts 1 are arranged, for example, in the exterior covering 6 at a ground potential and are electrically isolated from outside. The exterior covering 6 can be, for example, square in a cross section that is perpendicular to the axis line of the fixed-side conductor 5 and the movable-side conductor 15. An upper surface and a lower surface of the exterior covering 6 are horizontal. In this case, for example, the four conduction parts 1 are arranged at an angle of 45 degrees with respect to a horizontal plane around the axis line to be aligned with corners of the exterior covering 6 (the conduction parts 1 are arranged in lines leading from the axis line to the corners of the exterior covering 6), respectively, so that a certain insulating distance can be ensured without increasing the size of the exterior covering 6 and that increase in the component cost can be suppressed.

INDUSTRIAL APPLICABILITY

As described above, the present invention is useful as a power switchgear.

REFERENCE SIGNS LIST

1 Conduction part
2 Fixed-side fixed contact
3 Movable contact
4 Fixed-side connection conductor
4a, 5a, 14a, 15a Bottom
5 Fixed-side conductor
6 Exterior covering
7 Operating rod
8 Flange
10 Disconnecting part
12 Movable-side fixed contact
14 Movable-side connection conductor
15 Movable-side conductor
20 Mount

The invention claimed is:

1. A power switchgear comprising:
a cylindrical fixed-side conductor;
a cylindrical movable-side conductor that has an axis line aligned with an axis line of the fixed-side conductor and that is arranged to face the fixed-side conductor at a predetermined distance;
a plurality of cylindrical fixed-side connection conductors that are attached to the fixed-side conductor on a side of the movable-side conductor, and that have each axis line parallel to the axis line of the fixed-side conductor;
a plurality of cylindrical movable-side connection conductors that are attached to the movable-side conductor on a side of the fixed-side conductor, have each axis line parallel to the axis line of the movable-side conductor, and that are arranged at positions facing the fixed-side connection conductors;
cylindrical fixed-side fixed contacts that are connected to each of the fixed-side connection conductors, and that are arranged to have axis lines parallel to the axis line of the fixed-side conductor;
cylindrical movable-side fixed contacts that are connected to each of the movable-side connection conductors, and that are arranged to have axis lines parallel to the axis line of the movable-side conductor; and
movable contacts that are attached to the movable-side conductor to be capable of reciprocating in a direction of the axis line of the movable-side conductor, and that are inserted through each of the movable-side connection conductors,
wherein each outermost part of the fixed-side connection conductors, the fixed-side fixed contacts, the movable-side fixed contacts, and the movable-side connection conductors are located outside of each outermost diameter of the fixed-side conductor and the movable-side conductor, as viewed from the axis lines of the fixed-side conductor and the movable-side conductor as a center.

2. The power switchgear according to claim 1,
wherein the fixed-side connection conductors have bottoms on a side of the fixed-side conductor, respectively,
wherein the fixed-side connection conductors are attached to the fixed-side conductor via the bottoms,
wherein the movable-side connection conductors have bottoms on a side of the movable-side conductor, and
wherein the movable-side connection conductors are attached to the movable-side conductor via the bottoms.

3. The power switchgear according to claim 1,
wherein the axis lines of the fixed-side conductor and the movable-side conductor are horizontal,
wherein number of the fixed-side connection conductors and number of the movable-side connection conductors are four, respectively,
wherein the fixed-side connection conductors are arranged at an equal angular interval in a circumferential direction around the axis lines of the fixed-side conductor and the movable-side conductor, and are arranged at an angle of 45 degrees around the axis lines with respect to a horizontal plane including the axis lines, respectively, and
wherein the movable-side connection conductors are arranged at an equal angular interval in a circumferential direction around the axis lines of the fixed-side conductor and the movable-side conductor, and are arranged at an angle of 45 degrees around the axis lines with respect to a horizontal plane including the axis lines, respectively.

4. The power switchgear according to claim 3, wherein the power switchgear is arranged in an exterior covering that is square in a cross section perpendicular to the axis lines of the fixed-side conductor and the movable-side conductor and that has horizontal upper and lower surfaces.

\* \* \* \* \*